United States Patent [19]
Haas et al.

[11] Patent Number: 5,719,938
[45] Date of Patent: Feb. 17, 1998

[54] METHODS FOR PROVIDING SECURE ACCESS TO SHARED INFORMATION

[75] Inventors: Zygmunt Haas, Holmdel; Sanjoy Paul, Monmouth, both of N.J.

[73] Assignee: Lucent Technologies Inc., Murray Hill, N.J.

[21] Appl. No.: 284,025

[22] Filed: Aug. 1, 1994

[51] Int. Cl.$^6$ .................................................. H04L 9/08
[52] U.S. Cl. ............................................. 380/21; 380/4
[58] Field of Search ........................................ 380/4, 21, 25

[56]  References Cited

U.S. PATENT DOCUMENTS

| | | | |
|---|---|---|---|
| 5,010,571 | 4/1991 | Katznelson | 380/4 |
| 5,247,575 | 9/1993 | Spague et al. | 380/9 |
| 5,267,313 | 11/1993 | Hirata | 380/21 |
| 5,319,705 | 6/1994 | Halter et al. | 380/4 |
| 5,349,642 | 9/1994 | Kingdom | 380/25 |
| 5,509,074 | 4/1996 | Chavdhury et al. | 380/23 |

FOREIGN PATENT DOCUMENTS 6197105  7/1994  Japan ........................................ 380/21

*Primary Examiner*—Gilberto Barron, Jr.

[57]  ABSTRACT

The inventive methods employ symmetric encryption with first and second keys to provide secure access to information accessible to be shared among a dynamically changing set of authorized users on a network having a server. A single copy of the information, encrypted with the first key of the server, is stored in a location accessible to all network users. The second key is a private key of an authorized user and is used by the server to encrypt the first key. The encrypted first key is then stored by the server at a storage location accessible by the authorized user. The user accesses the storage location, obtains the encrypted first key, and uses his private second key to decrypt and thereby recover the first key. The user then decrypts the stored information using the recovered first key.

17 Claims, 4 Drawing Sheets

FIG. 6

```
        MOV AX,  I(FIRST)    //INDIRECTLY JUMP THROUGH INDEXING WITH THE CONTENT
                             //OF LOCATION FIRST
        MOV DS,  AX
        MOV SUM, 0
        CMP SUM, 100
        JNA NOT-DONE
FIRST:  MOV AL,  SUM         //THE VALUE OF THIS LOCATION DETERMINES THE KEY OFFSET
          .
          .
NOT-DONE:
          .
          .
          .
        MOV DS,  AX
        MOV ES,  AX
        CMP SUM, 73          //OFFSET WITH FIRST POINTS HERE. THE KEY STARTS
        MOV SI,  AX          //HERE AND MAY GO ON SPANNING SEVERAL
          .                  //"DUMMY" INSTRUCTIONS
          .
          .
```

FIG. 7

```
        MOV AX,  I(SECOND)   //INDIRECTLY JUMP THROUGH INDEXING WITH THE CONTENT
                             //OF LOCATION SECOND
        MOV DS,  AX
        MOV SUM, 0
        MOV AL,  SUM
        CMP SUM, 100
        JNA NOT-DONE
          .
          .
NOT-DONE:
          .
          .
          .
SECOND: CMP SUM, 45          //THE VALUE OF THIS LOCATION DETERMINES THE KEY OFFSET
          .
          .
        MOV DS,  AX
        MOV ES,  AX
        CMP SUM, 73          //OFFSET WITH SECOND POINTS HERE. THE KEY STARTS
        MOV SI,  AX          //HERE AND MAY GO ON SPANNING SEVERAL
          .                  //"DUMMY" INSTRUCTIONS
          .
          .
```

METHODS FOR PROVIDING SECURE ACCESS TO SHARED INFORMATION

FIELD OF THE INVENTION

The present invention relates to a method for providing secure access to shared information in a network computing environment. More particularly, the present invention relates to a method for providing efficient and secure access in a network to information consisting of electronically stored documents.

BACKGROUND OF THE INVENTION

There is at present a need for methods and apparatus for providing secure access to shared information in a computer network environment. More specifically, there is a need for a large-scale system (i.e. one having a large number of users) in which a dynamically-varying subset of users is permitted access to a relatively large amount or grouping of associated information for a limited time duration, the time duration being user-dependent. For example, for an electronic newspaper—i.e. an electronically-stored copy or version of a conventional printed newspaper or the like—a set of users (the subscribers) is permitted access to the electronic newspaper for a predetermined length of time in return for a user-paid subscription fee. As used herein, the term electronic newspaper is intended to broadly denote any grouping or set of associated, electronically-stored information to which access is to be provided to a relatively large and dynamically changing plurality of users.

Typically, there are no significant restrictions on either the storage system or the transmission medium for such shared information. Thus, it would be desirable to provide a universal mechanism to prevent unauthorized access to the shared information.

SUMMARY OF THE INVENTION

An advantageous method in accordance with the present invention for securely sharing information in networks is provided through an association between the communicating parties formed using at least two cryptographic keys. A server contains the information to be accessed, encrypted by a first key, and the user requesting the information holds a second key. A "locker", associated with or accessible by—optionally only by—the user, holds the first key in a form that has been encrypted (i.e. "locked") with the second key of the user, so that only that user can decrypt the first key and thereby enable decryption of the information to be accessed. Typically, the locker is a buffer or memory storage location at the server although it may advantageously be located anywhere on the network, as for example at the user's workstation. The information securement method of the present invention may thus be termed the Locker Key method and the first key may be denoted the Locker Key since it is stored in encrypted form in the user's locker. When an authorized user requests access to the stored information, the encrypted first key is placed in the user's locker. The user accesses his locker, employs his second key to decrypt the first key and then uses the decrypted first key to decrypt the information. The inventive method accordingly uses two symmetric cryptographic systems: (1) the first key that both encrypts and decrypts the information to be accessed, and (2) the second key that both encrypts and decrypts the first key.

The inventive method provides a number of significant advantages. The information to be accessed is encrypted only once and only a single copy is stored by or at the server for access by a dynamically-varying plurality of users. Moreover, the encryption of the information is performed off-line rather than at the time that any particular user requests access to that information. In addition, there is no need to redistribute the first key when it changes. The method of the invention is particularly advantageous and suitable for use in providing secure access electronic newspapers and multimedia documents and the like.

The present invention may also provide users with an interface routine that integrally incorporates and restricts user access to the first key. The routine is run or executed on the user's local terminal or computer or machine which automatically communicates with the server, retrieves the encoded first key from the user's locker, decrypts the first key, uses the decrypted first key to decrypt the information from the server, and then displays the information to the user. When the user's permission to access the information expires, no new key is placed in the user's locker and the interface routine will be unable to successfully decrypt the information.

The various features of novelty which characterize the invention are pointed out with particularity in the claims annexed to and forming a part of this disclosure. For a better understanding of the invention, its operating advantages and specific objects attained by its use, reference should be made to the accompanying drawings and descriptive matter in which there are illustrated and described several currently preferred embodiments of the invention.

BRIEF DESCRIPTION OF THE DRAWINGS

In the drawings, wherein similar reference characters denote similar elements throughout the several views:

FIG. 6 is a computer source code listing of a first embodiment of a portion of an interface routine in accordance with the present invention; and FIG. 7 is computer source code listing of a second embodiment of a portion of an interface routine in accordance with the present invention.

DETAILED DESCRIPTION OF THE PREFERRED EMBODIMENTS

The present invention provides a novel solution to the problem of providing secure access to shared information in a network computing environment. In general, security in communications systems involves the attributes of source/destination authentication, information privacy, information integrity, prevention of unintended service denial, and copyright enforcement. The present invention addresses primarily two of those attributes, namely authentication and copyright enforcement.

The invention operatively provides secure access to shared information, such as an electronic newspaper, by a method useful in an architecture in which a network, including a group of users, may wish or seek to acquire access to a shared piece or set of information located in the same place (e.g. at the server). This is accomplished through the use of two secret encryption keys—a first secret key $K_{news}$ and a second secret key $K_i$. The first secret key $K_{news}$ is also referred to herein as the "locker key" $K_{news}$, which refers to the fact that during at least one step of the inventive method the key $K_{news}$ is stored in a "locker" or buffer or storage location associated with a particular user that is legitimately permitted to access the stored information (i.e. the electronic newspaper). The second secret key $K_i$ is the private key of the user i. Throughout this specification, the designation user i should be understood as denoting either a particular human operator or an application program executing at a subscriber work station or network node or connection. The notation $E_k(X)$, as used herein, identifies information X, such for example as an electronic newspaper 32 (FIG. 1), that has been encrypted using the encryption key k.

Figure 1:
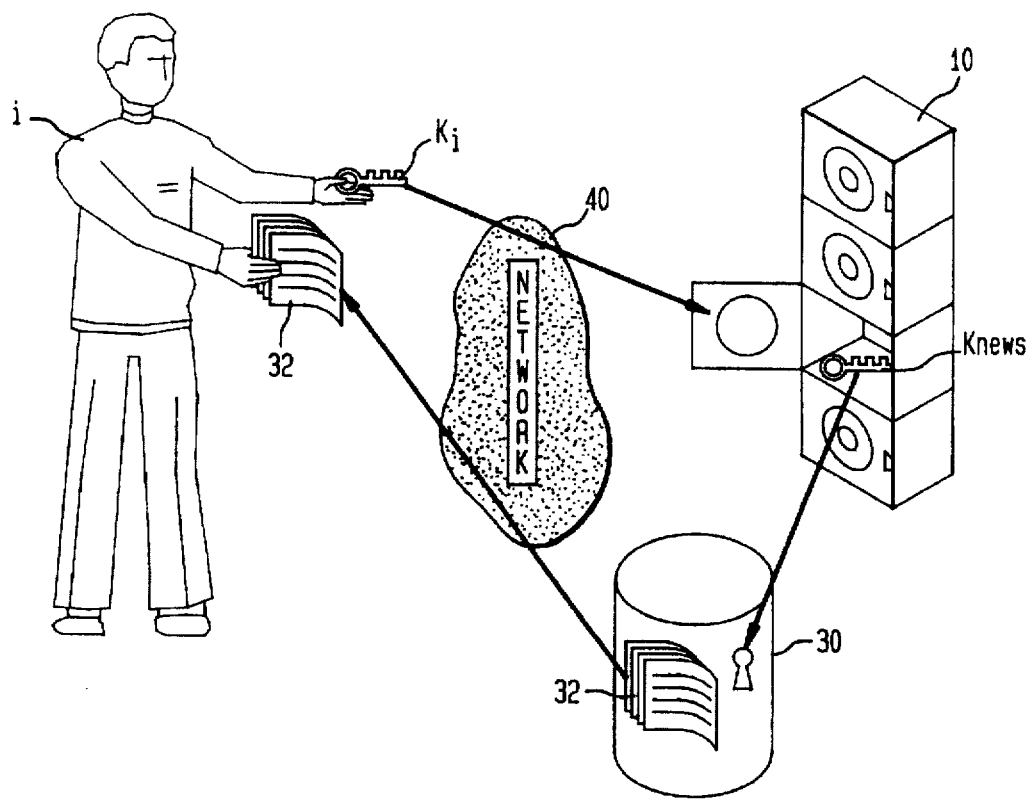
FIG. 1 is a pictorial block diagram of an embodiment of the present invention.

The inventive method is pictorially depicted in FIG. 1 to which reference should be made in considering the following description.

The inventive method protects the stored information, e.g. the electronic newspaper 32, from users outside of the authorized group by encrypting it with the first key $K_{news}$ (i.e. the server's private key, generated by and known only to the server). Then the key $K_{news}$ is made available only to users within the authorized group. Each user i is assigned or provided with access to a "locker". It is generally contemplated that the locker is a storage location or buffer 10 at a server 30, but it may alternatively be located anywhere in the network 40. The locker key $K_{news}$ is placed in the user's buffer 10 in a form encrypted with that user's private key $K_i$, i.e. $E_{Ki}(K_{news})$. A single copy of the electronic newspaper 32 is stored at or by the server 30, encrypted with the key $K_{news}$. A user i that wishes to access or view (i.e. purchase) that stored copy of the electronic newspaper 32 transmits his private key $K_i$, which is known to and/or generated by the user i, to the server 30. In return, the key $E_{Ki}(K_{news})$, i.e. $K_{news}$ encrypted by the key $K_i$, is placed in the buffer 10 of the user i. When user i thereafter wishes to view or access the encrypted newspaper, or a portion thereof, user i retrieves the encrypted form of the key $K_{news}$ from the buffer 10, uses his private key $K_i$ to decrypt the key $K_{news}$, and then uses the decrypted key $K_{news}$ to decrypt the encrypted newspaper or desired portion thereof.

The first key $K_{news}$ and the second key $K_i$ may, for example, be defined as a series of characters, such as numbers or letters or combinations thereof. Network-generated numbers may be in binary form or may, after being generated, be converted to binary form.

Figure 2:
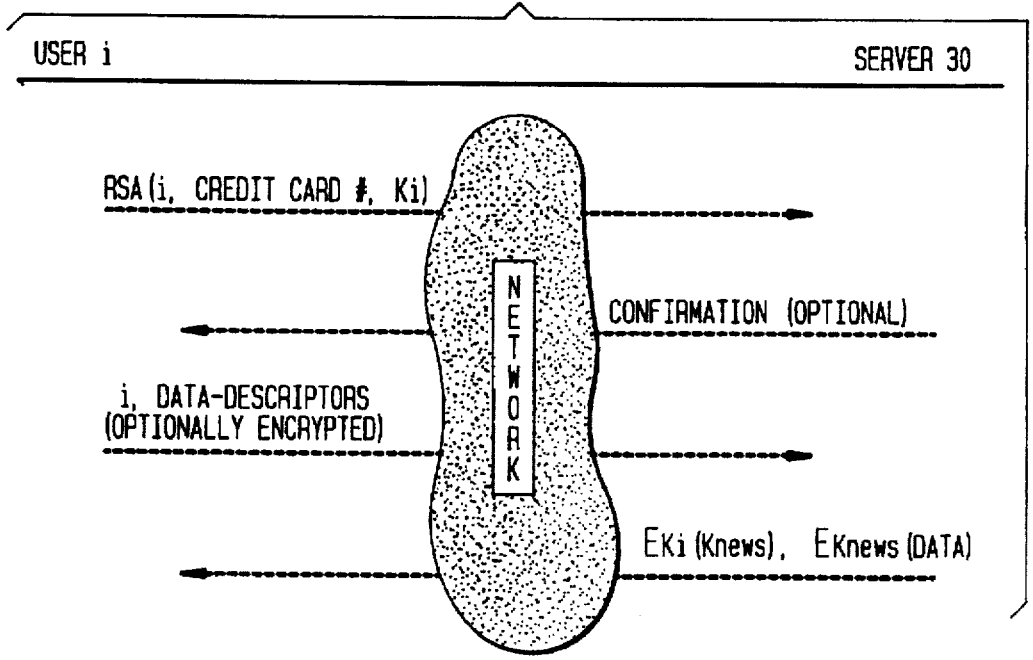
FIG. 2 is a pictorial diagram of a first embodiment of the present invention for controlled access to an electronic newspaper.

The exchange of information for accessing an electronic newspaper in accordance with one form of the inventive method is more particularly illustrated in FIG. 2. In the initial set-up phase, the user i transmits his ID as an identification parameter—e.g. a network identification name or number—his credit card number (for billing purposes), and his/her private key $K_i$ to the server 30. This information is preferably encrypted with a public key $K_{serv}$ of the server 30 to prevent unintended third party access. The server 30 may, optionally, then confirm the request or subscription.

The server's public key $K_{serv}$ is assumed to be freely available to subscribers from a key registry, which is the equivalent of a "yellow pages" for public key cryptography. The public key $K_{serv}$ allows secure transmission of start-up or query data to various servers, such as for storing and providing access to newspapers, weather, stock quotes, etc. Asymmetric cryptology by public key encryption is used only for public key $K_{serv}$ at this initial set-up stage for secure transmission of the secret information of user i to the server (e.g., the key $K_i$) and to mask the identity of the user. In contrast, the inventive method employs symmetric cryptography for subsequent encryption/decryption of data with keys $K_i$ and $K_{news}$. Thus, after the set-up stage user i may request access to the newspaper data by sending to the server 30 his ID (i) with a description (data-descriptor) of the requested data. These fields may optionally be encrypted with the private key $K_i$ to provide user privacy, i.e. where user i does not want others to know what data he is accessing. The server 30 responds by sending the key $K_{news}$, encrypted with the user's private key $K_i$. Then, typically, the requested newspaper data, encrypted with $K_{news}$, is sent to user i.

The entire newspaper represents a rather large amount of data, and it is anticipated that user requests will generally be article-based—i.e. a user may first request an index of articles, with each future access seeking only one or more individual articles. Thus, each article in the newspaper may be individually encrypted, allowing more rapid access to each individual article. However, the invention is also intended to accommodate variations in which the entire newspaper is encrypted as a single document.

The present invention provides a number of important advantages. For one, only a single encrypted copy of the electronic newspaper is stored on or by the server. Moreover, encryption of the newspaper is performed only once for a given key $K_{news}$. In addition, the encryption can be done "off-line", i.e. not in "real time", thus avoiding server congestion at times of peak demand.

The inventive method, as hereinabove described, provides a reasonably high measure of security. However, it is potentially susceptible to fraud by subscribers that may improperly distribute the keys $K_i$ and $K_{news}$, or the decrypted newspaper itself, to non-subscribers or others who do not pay or otherwise properly request and obtain access to the information. Protection against distribution of the decrypted locker key $K_{news}$ is provided by frequent changing of the locker key. Thus, the server 30 may periodically re-encrypt the newspaper using a new locker key $K_{news}$ and place this new key, encrypted by each respective user's private key $K_i$, in all eligible lockers. When a user's access permission expires, that user's locker is not reloaded with the encrypted new locker key. Advantageously, in accordance with the invention, when the locker key changes, the server need not multicast or widely distribute the new locker key; only the lockers of then eligible or authorized users need to be modified. Authorized users may thus access their lockers with their respective private keys $K_i$ to retrieve and decrypt the encrypted new locker key.

Figure 3:
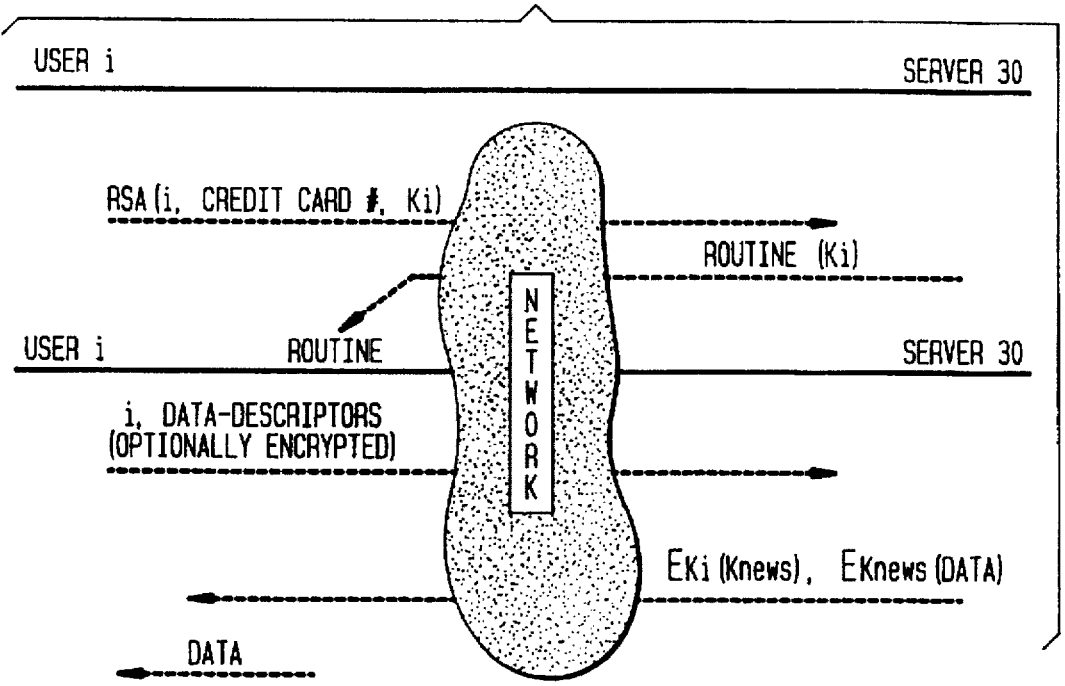
FIG. 3 is a pictorial diagram of a second embodiment of the present invention employing an interface routine operable for providing controlled access to the electronic newspaper.

A second embodiment of the inventive method seeks to avoid such fraudulent behavior by restricting users' direct access to the server 30, and to the decrypted key $K_{news}$, through the use of an interface routine. The interface routine is a relatively short software program that is sent as object code to the user i, as shown in FIG. 3, in response to user payment of the information access fee. The user i's work station uses the interface routine to access the server 30 in such a way that the value of the key $K_{news}$ is hidden from user i. This prevents user i from improperly distributing the key $K_{news}$ or from manually decrypting and distributing the newspaper. The interface routine acts as an extension of the server 30 that is remotely executed on the user i's hardware. Thus, all communication between the user i and server 30 is performed through and by the interface routine. At each intended access of the stored information, the user i invokes the routine, which automatically, and without user intervention, retrieves the encrypted key $E_{Ki}(K_{news})$ together with the encrypted newspaper portion of interest $E_{Knews}$ (news) from the server 30. The interface routine then uses the user i's private key $K_i$ to decrypt the locker key $K_{news}$, and uses the decrypted locker key $K_{news}$ to decrypt the newspaper or data portion. The decrypted text is then sent to the user i's application program or displayed on his/her screen, as for example in a window of a graphical user interface.

Of course, the user i may still fraudulently redirect the displayed output to a file and distribute the file itself to others. However, the relatively large size of the newspaper makes it difficult and time consuming for users to download the entire newspaper. Thus, a user's ability to fraudulently distribute such data is limited.

Figure 4:
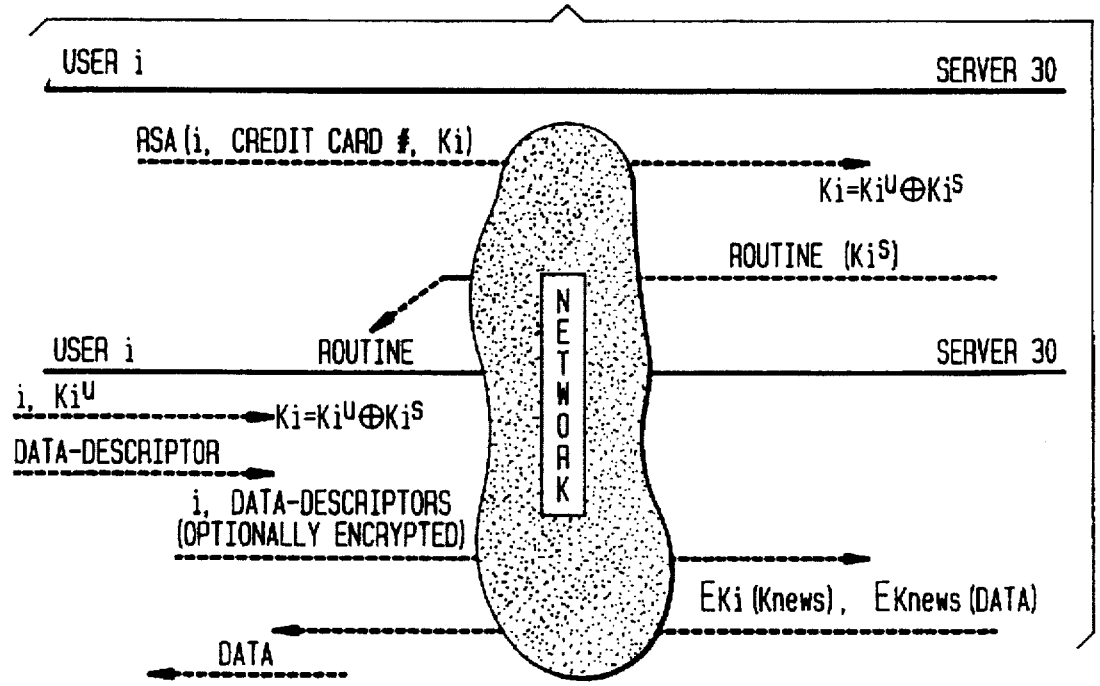
FIG. 4 is a pictorial drawing of a third embodiment of the present invention.

Since each user i knows his/her locker key $K_i$, user i could still intercept the communication between the routine and the network to retrieve $E_{Ki}(K_{news})$, obtain and publicly distribute the public key $K_{news}$ (i.e. manually bypass the interface routine). This problem can be avoided by creating the user key $K_i$ from two components: one component $K_i^u$ supplied by the user, and one component $K_i^s$ supplied by the server. The key $K_i$ is then computed by the server and by the interface routine, for example as $K_i = K_i^u \oplus K_i^s$ where $\oplus$ denotes a bitwise exclusive-or (XOR) operation; this is depicted in FIG. 4. Thus, only the combination of the server 30 and the interface routine know $K_i$; the server-supplied $K_i^s$ is hidden in the routine, and the composite key $K_i$ is not therefore known to the user i. Accordingly, even if a user i intercepts the communication between the server 30 and the routine, he cannot retrieve the key $K_{news}$ because he does not know $K_i$. Moreover, no user other than the intended user i can provide $K_i^u$ to the routine to compute the composite key $K_i$ that is required to access the encrypted newspaper data.

It will be recognized that a dishonest user i may yet transmit a copy of the interface routine to an unauthorized user j, who could then use the routine to access the newspaper so long as user i additionally supplies user j with his (secret) key component $K_i^u$. This permits user j to invoke the interface routine and to supply user i's key component $K_i^u$ to the routine to attain access to and view the electronic newspaper. A variety of deterrents to such practice may optionally be employed.

A first deterrent is to have the interface routine, when invoked using the correct user key component $K_i^u$, configured to allow access to the user i's credit card number, as for example by flashing or displaying the credit card number of user i on the screen. Such an improvement may make user i somewhat more reluctant to provide others with the interface program and his key component $K_i^u$.

A second deterrent is to have the user transmit during the set-up stage—as for example with the initial message from the user—(1) his credit card number and (2) a list of Internet Packet (IP) addresses of a limited number of machines or stations or locations from which user i anticipates seeking access to the electronic newspaper. The interface routine may then be configured so that each time it is invoked, it transmits to the server the IP address of the node or terminal from which it has been invoked and the routine's ID, which is itself associated with the particular user i. The server 30 can then confirm whether the routine was invoked from one of the previously-specified IP addresses and, if not, the server may (1) separately and additionally charge the user i for each such access from a machine or location not in the original list, (2) deny access to the machine or location not in the original list, or (3) direct all responses to the location of one of the previously specified IP addresses. Of course, the user i may selectively request a change of his registered IP address by sending such request to the server in suitably encrypted form, thus preventing user j from altering user i's registration information without user i's knowledge.

Figure 5:
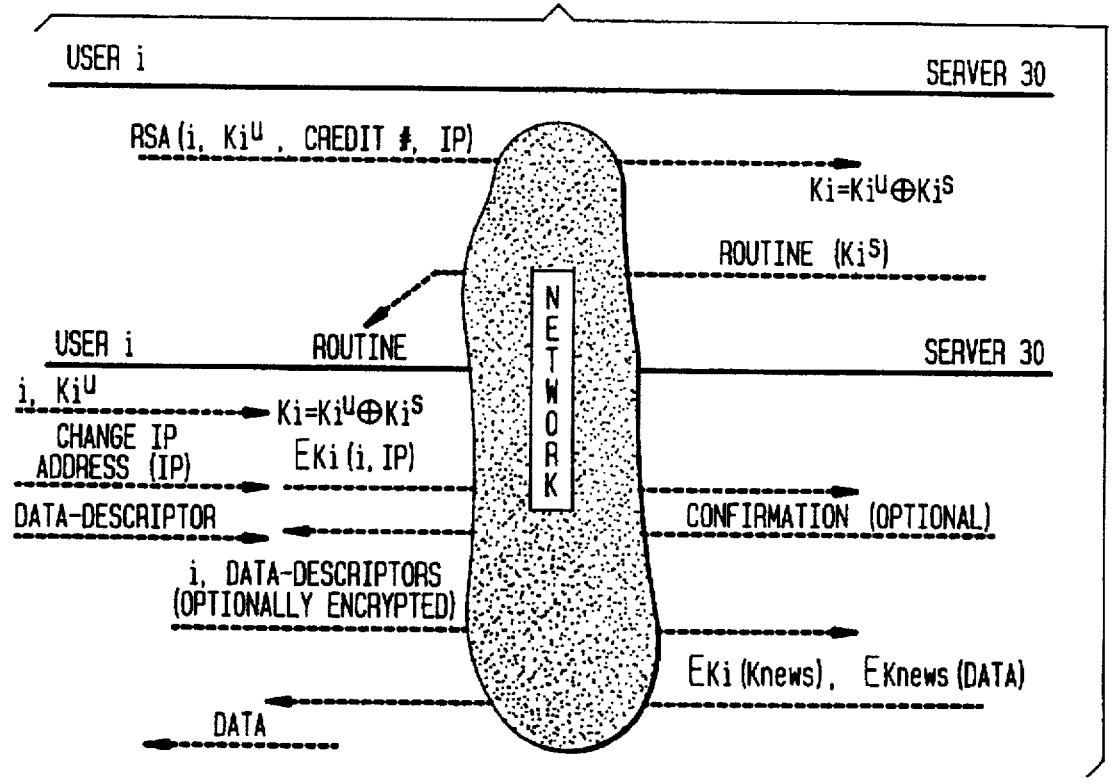
FIG. 5 is a pictorial drawing of a fourth embodiment of the present invention.

A third deterrent is to have the server 30 allow only one copy of each user's interface routine to be active at any given time. This variation is shown in FIG. 5 and requires that the routine send its IP address to the server 30 when it is invoked. If the server 30 finds that the same routine is already active, it will prevent the newly-invoked routine from proceeding to retrieve either the locker key or the encrypted version of the electronic newspaper. Thus, if a user i distributes copies of his interface routine to one or more unauthorized users j, only one of them will be able to use the routine at any given time, all others being denied concurrent service.

The herein-disclosed methods of the present invention that utilize an interface routine are, as will be appreciated, most effective if the interface routine is constructed so as to be highly tamper-resistant. For example, the routine should integrally hide the values of the required keys and key components. Preferably, the code is made sufficiently difficult so that "manual" processing is required to reverse engineer (i.e. disassemble) the code. Additionally, the routine may be written such that a forged or unauthorized version of such a routine would be readily detectable by server 30.

Preferably, to prevent unauthorized access the routine will be frequently changed, i.e. customized and redistributed, for example, with every new electronic newspaper edition. The routine is customized to have a structure that prevents improper automatic retrieval of data from the routine code and that renders manual retrieval of data much more expensive in time and resources than the price of access to the data itself. Customization of the routine may, by way of example, involve changing the location of the keys within the routine's code or within run-time memory, changing the data flow of the routine's execution, or adding extra commands. In addition, the routine may interleave data and executable code to prevent automatic disassembling of the code. Preferably, the hidden keys may be translated into meaningful machine language instructions and the key location randomly moved within the machine code of the routine. Furthermore, references in the program to the location of a key can be indirect so as to require an intruder to closely follow the code execution flow to determine the key location.

FIGS. 6 and 7 show, by way of nonlimiting example, portions of two differently-customized routines that perform the same task. Two keys are hidden in different program locations that are only indirectly accessed. In these routines, the indirect access is based on the content of another memory location (FIRST and SECOND), but can also be implemented using the contents of a register. This arrangement makes it difficult to design a program operable for determining the location of the key. The key in both routines is, moreover, translated into a sequence of legitimate machine instructions. These routines can accordingly hide the same key in different locations or two different keys in different locations.

An example illustrating the operating efficiencies attainable in accordance with the present invention now be described.

The following calculations compare the access times experienced by users accessing an electronic newspaper, first in a system $S_1$ based on batch encryption in accordance with the inventive method, and then in a second system $S_2$ in which the encryption is performed in real time in response to user requests as in the prior art. The calculations assume a single encryption server and that the arrivals of requests at the electronic newspaper server are Poisson-distributed with parameter $\lambda$. The access time in each of the systems $S_1$, $S_2$ consists of a number of components.

System $S_1$ performs the steps of: retrieving the encrypted locker key, hereinafter –r(LC); retrieving the pre-computed ciphertext of the requested article, hereinafter –r(CT); and transmitting the two items back to the user, hereinafter –t(LC+CT).

System $S_2$ performs the steps of: retrieving the requested data, hereinafter –r(A); encrypting the articles, hereinafter –e(A); and transmitting the ciphertext, hereinafter t(CT).

Assuming zero load, the access times $x_1$ for the system $S_1$ and $x_2$ for the system $S_2$ are:

$$x_1 = r(LC) + r(CT) + t(LC+CT)$$

$$x_2 = r(A) + e(A) + t(CT) \quad \text{(Eq. 1)}$$

In general, the server-generated key LC is of fixed length, whereas the lengths of the cipher text CT and of the cleartext article A are random variables (r.v.). Thus, $x_1$ and $x_2$ are also r.v. with some distribution. Each retrieval process r(●) and transmittal process t(●) can be modeled as a queue. Consequently, each of the systems $S_1$ and $S_2$ employs a series of three queues in tandem. This example assumes the following relationships:

1. One queue is considerably more congested than others, creating a bottleneck.
2. The time to perform the retrieval, transmission, and encryption operations is linear with the amount of data.
3. The time to retrieve the encrypted locker key is considerably shorter than the time to retrieve the article ciphertext; i.e., LC<<CT and r(LC)<<r(CT)
4. The size of the ciphertext is proportional to and longer than the cleartext size.
5. The time to encrypt a piece of data is considerably longer than the time to retrieve and/or to transmit the same piece of data.

The calculations further assume that the bandwidth of the retrieval operation is considerably larger than the network transmission bandwidth. This last assumption, while reasonable in conventional networks, may not be valid in some systems—as for example in gigabit networks.

Based on the foregoing assumptions, the calculations approximate the systems $S_1$ and $S_2$ as single M|G|1 queue systems with access times given, respectively, by:

$$x_1 = t(LC+CT) = t(CT) \text{ and } x_2 = e(A) \quad \text{(Eq. 2)}$$

The term M|G|1, as used herein, defines a specific type of queue system; such a queue system is, for example, described in L. Kleinrock, Queuing Systems: Vol. 1: Theory (John Wiley & Sons 1975).

By assuming the above-mentioned relationships (2), (4) and (5), we may assert that $$\bar{x}_2 = k \cdot \bar{x}_2 (k>1).$$

Using the Pollaczek-Khinchin formula (L. Kleinrock, "Queueing Systems: Vol. 1: Theory", p. 191 (John Wiley &

Sons 1975)), the waiting times in the queues $S_1$ and $S_2$, respectively, are:

$$W_{S_1} = \frac{\lambda}{2} \cdot \frac{\bar{x}_1^2(1+C_{x_1}^2)}{(1-\rho_1)} \quad \text{and} \quad \text{(Eq. 3)}$$

$$W_{S_2} = \frac{\lambda}{2} \cdot \frac{\bar{x}_2^2(1+C_{x_2}^2)}{(1-\rho_2)}$$

where $\rho_i$ is the utilization of queue i, and $C_{x_i}$ is the coefficient of variation of the process $x_i$ (i=1, 2). The coefficient of variation of a random process x is defined as $$C_x = \frac{\sqrt{\sigma_x}}{\bar{x}}.$$

Thus, $$\frac{W_{S_2}}{W_{S_1}} = \frac{k(1+C_{x_2}^2)(k-\rho_1)}{(1+C_{x_1}^2)(1-\rho_2)} \quad \text{(Eq. 4)}$$

Due to assumption (4) above, the distribution of the ciphertext length has different parameters but the same shape as the distribution of the cleartext length. Furthermore, by virtue of assumption (2), the times to transmit the ciphertext and to encrypt the cleartext are proportional to the size of the cipher and cleartext, respectively. Consequently, the distributions of r.v.t(CT) and e(A) have the same shape and $C_{x_1}=C_{x_2}$. Therefore, $$\frac{W_{S_2}}{W_{S_1}} = \frac{k(k-\rho_1)}{(1-\rho_2)} \quad \text{(Eq. 5)}$$

Thus, the mean waiting time for the batch system of the present invention is reduced by a factor on the order of $k^2$ as compared to the mean waiting time for the prior art real-time system.

The mean system time ($T_S$) is defined as the sum of mean waiting time ($W_x$) and the mean service time ($\bar{x}$), i.e.

$$T_{S_1} = W_{S_1} + \bar{x}_1$$

and $$T_{S_2} = W_{S_2} + \bar{x}_2 = W_{S_2} + k\bar{x}_1 \quad \text{(Eqs. 6)}$$

Therefore, $$\frac{T_{S_2}}{T_{S_1}} = \frac{W_{S_2} + k\bar{x}_1}{W_{S_1} + \bar{x}_1} \geq \frac{W_{S_2}}{W_{S_1}} = \frac{k(k-\rho_1)}{(1-\rho_2)} \quad \text{(Eq. 7)}$$

The access times of the systems $S_1$ and $S_2$ are compared by assuming, in Equation 7, that the average article or electronic document is on the order of 5000 bytes, that the (software-based) encryption speed is on the order of 100 Kbps, that the size of the ciphertext approximately equals the corresponding cleartext, that the transmission links are T1 lines ($\approx$1.5 Mbps), and that the memory access throughput is 10 Mbps (i.e. r(CT)<<t(CT)). This comparison indicates that the first system $S_1$, which employs the inventive method, has an access time of about 1/435th, or about 0.02%, of the access time of the second or prior art system $S_2$.

Thus, there is realized a substantial improvement in access time by encrypting the electronic newspaper once, off-line, for all users as compared to individually encrypting the newspaper for each user in real-time upon arrival of that user's request.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of controlling access to electronically-defined information among a plurality of users connected to a network having a server operable for assuring that the electronically-defined information is accessible by only at least a predetermined one of the plural users, each of said plural users having a unique first encryption key having a first portion and a second portion, said method comprising the steps of:

making said first portion known to both the server and said predetermined user;

making said second portion known only to the server;

encrypting the electronically-defined information using a second encryption key known only to the server to define encrypted information;

storing the encrypted information in network-associated electronic storage accessible through the network to said plurality of users;

encrypting the second encryption key using the first encryption key of the predetermined user to which access to the electronically-defined information is to be provided so as to define an encrypted second key;

storing the encrypted second key in an electronic storage location accessible by said predetermine user; and attaining access by the predetermined user to the unencrypted electronically-defined information by:

accessing the stored encrypted second key from a network-connected apparatus of the predetermined user;

decrypting the accessed encrypted second key using the first key of the predetermined user at the apparatus of the predetermined user to recover the second encryption key;

accessing the stored encrypted information from the network-connected apparatus of the predetermined user; and decrypting the accessed encrypted information using the recovered second encryption key to recover the electrically-defined information for examination of the recovered information by the predetermined user.

2. A method in accordance with claim 1, further comprising the step of generating the second encryption key at the server.

3. A method in accordance with claim 1, further comprising the steps of:

periodically generating a new second encryption key to replace a then-current second encryption key; and each time that a new second encryption key is generated, encrypting the new second encryption key using the first encryption key of the predetermined user so as to define a new encrypted second key; and storing the new encrypted second key in the electronic storage location accessible by the predetermined user to replace the encrypted second key previously stored in the electronic storage location for access by the predetermined user.

4. A method in accordance with claim 3 and further comprising, each time that a new second encryption key is generated, the steps of:

encrypting the electronically-defined information using the new second encryption key to define newly-encrypted information; and storing the newly-encrypted information in the network-associated electronic storage accessible through the network to said plurality of users to replace the previously-stored encrypted information.

5. A method in accordance with claim 1, wherein said step of storing the encrypted second key comprises storing the encrypted second key in an electronic storage location accessible only by the predetermined user.

6. A method in accordance with claim 1, wherein said step of storing the encrypted information comprises storing the encrypted information in electronic storage associated with the server.

7. A method in accordance with claim 1, wherein said steps of accessing the stored encrypted second key, decrypting the accessed encrypted second key to recover the second encryption key, and decrypting the accessed encrypted information using the recovered second encryption key being carried out by operation of an executable program routine so as to restrict direct access by the predetermined user to the recovered second encryption key and thereby prevent unintended access to the recovered second encryption key by ones of said plural users other than the predetermined user.

8. A method in accordance with claim 1, wherein said steps of accessing the stored encrypted second key, decrypting the accessed encrypted second key to recover the second encryption key, and decrypting the accessed encrypted information using the recovered second encryption key being carried out by operation of an executable program routine at the apparatus of the predetermined user so as to restrict direct access by the predetermined user to the recovered second encryption key and thereby prevent unintended access to the recovered second encryption key by ones of said plural users other than the predetermined user.

9. A method in accordance with claim 1, where in said step of storing the encrypted second key comprises storing the encrypted second key in an electronic storage location associated with the apparatus of the predetermined user.

10. A method in accordance with claim 1, wherein said step of encrypting the electronically-defined information comprises dividing the information into a multiplicity of information portions and separately encrypting each of the multiplicity of information portions to define encrypted information comprising a multiplicity of separately-encrypted portions each individually accessible by predetermined ones of said plural users.

11. A method of controlling access to electrically defined information among a plurality of users connected to a network having a server operable for assuring that the electronically defined information is accessible by only at least a predetermined one of the plural users, each of said plural users having a unique first encryption key having a first portion and a second portion, said method comprising the steps of:

making said first portion known to both the server and said predetermined user;

making said second portion known only to the sever;

storing electronically defined information, encrypted using a second encryption key known only to the server, in network-associated electronic storage accessible through the network to said plurality of users; and attaining access, by a predetermined one of the plural users, to the unencrypted electronically defined information by:

accessing the network from a network-connected apparatus of the predetermined user to further access the second key encrypted using the first encryption key of the predetermined user;

decrypting the accessed encrypted second key using the first key of the predetermined user at the apparatus of the predetermined user to recover the second encryption key;

accessing the stored encrypted information from the network-connected apparatus of the predetermined user; and decrypting the accessed encrypted information using the recovered second encryption key to recover the electronically defined information for examination of the recovered information by the predetermined user.

12. The method of claim 11, wherein said storing step includes the steps of:

encrypting the electronically defined information using the second encryption key known only to the server to define the encrypted information; and storing the encrypted information in network-associated electronic storage accessible through the network to said plurality of users.

13. The method of claim 11 wherein, prior to the second key decrypting step, the method further includes the steps of:

encrypting the second encryption key using the first encryption key of the predetermined user to which access to the electronically defined information is to be provided so as to define the encrypted second key; and storing the encrypted second key in an electronic storage location accessible by said predetermined user.

14. The method according to claim 1, further comprising the steps of:

obtaining a credit card number from said predetermined user; and causing said credit card number to be communicated to said predetermined user during said step of decrypting the accessed encrypted information so as to discourage said predetermined user from sharing the first encryption key with a user to whom access is not permitted.

15. The method according to claim 1, further comprising:

(a) assigning a unique network address to the network connected apparatus of said predetermined user;

(b) determining, during the step of accessing the stored encrypted information, the unique network address of the network connected apparatus from which access to the encrypted information is being sought;

(c) determining if the unique network address determined in said step (b) matches the unique network address assigned, to the network connected apparatus of the predetermined user; and (d) preventing the step of decrypting the accessed encrypted information from occurring if no match is found in said step (c).

16. The method according to claim 11, further comprising the steps of:

obtaining a credit card number from said predetermined user; and causing said credit card number to be communicated to said predetermined user during said step of decrypting the accessed encrypted information so as to discourage said predetermined user from sharing the first encryption key with a user to whom access is not permitted.

17. The method according to claim 11, further comprising:

(a) assigning a unique network address to the network connected apparatus of said predetermined user;

(b) determining, during the step of accessing the stored encrypted information, the unique network address of the network connected apparatus from which access to the encrypted information is being sought;

(c) determining if the unique network address determined in said step (b) matches the unique network address assigned to the network connected apparatus of the predetermined user; and (d) preventing the step of decrypting the accessed encrypted information from occurring if no match is found in said step (c).

* * * * *